(No Model.)

J. HOLTZHOUSER.
WEIGHING SCALE.

No. 527,427. Patented Oct. 16, 1894.

Witnesses:
Joseph Arth Cantin.
Arthur B. Jenkins.

Inventor:
Jacob Holtzhouser.
by Chas. L. Burdett,
Attorney.

UNITED STATES PATENT OFFICE.

JACOB HOLTZHOUSER, OF NEW BRITAIN, CONNECTICUT.

WEIGHING-SCALE.

SPECIFICATION forming part of Letters Patent No. 527,427, dated October 16, 1894.

Application filed June 12, 1893. Serial No. 477,266. (No model.)

*To all whom it may concern:*

Be it known that I, JACOB HOLTZHOUSER, of New Britain, in the county of Hartford and State of Connecticut, have invented certain new and useful Improvements in Weighing-Scales, of which the following is a full, clear, and exact description, whereby any one skilled in the art can make and use the same.

The object of my invention is to provide a weighing scale in which the hand operating devices shall be so constructed as to cause the hand to travel equal distances under equal additions to the weight imposed on the scale.

To this end my invention consists more particularly in the details of the several parts making up the rack and pinion and in the combination of such parts in a weighing scale as more particularly hereinafter described and pointed out in the claims.

Figure 1:
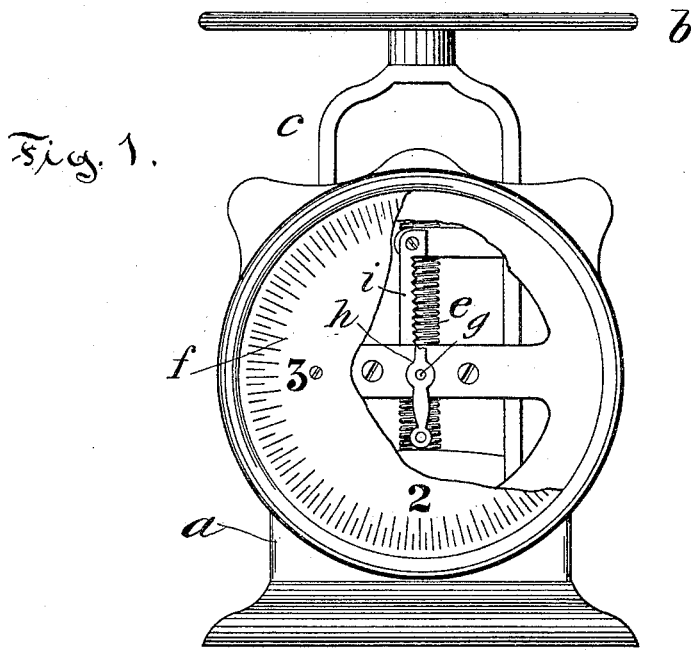
Figures 2, 3, 4:
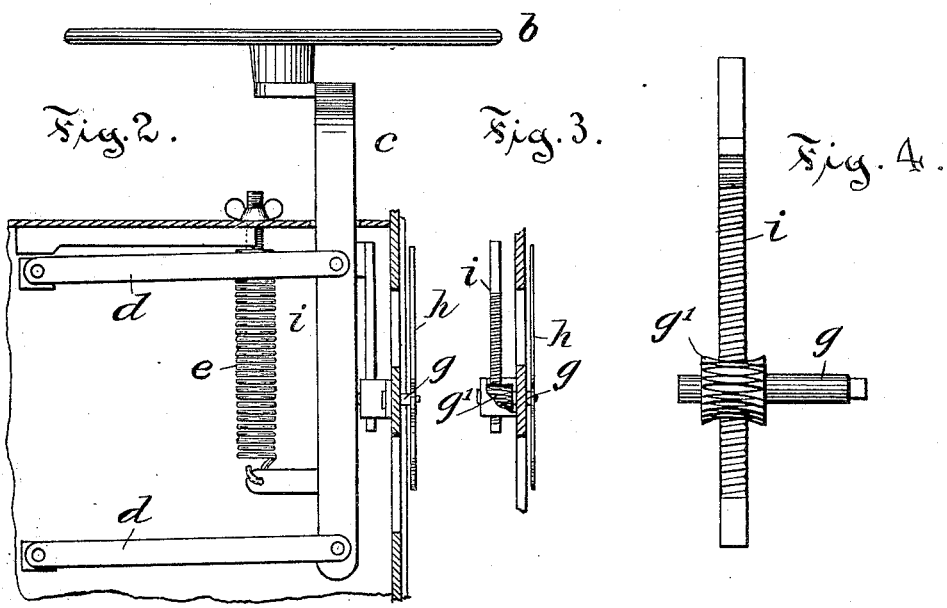

Referring to the drawings: Figure 1 is a detail front view of a scale with part of the dial broken away to show construction. Fig. 2 is a detail view of a portion of the scale in vertical section through the frame and showing the operative parts. Fig. 3 is a detail sectional view of part of the hand operating mechanism. Fig. 4 is a detailed view on enlarged scale of the rack and pinion.

In the accompanying drawings the letter $a$ denotes the frame of a weighing scale; $b$, the platform on which the article to be weighed is placed; $c$, the standard that is pivotally supported on the levers $d$ and held in place by means of the coiled spring $e$.

On the front of the frame is a dial $f$, and a short shaft $g$ journaled in the front part of the frame supports a hand $h$ the point of which indexes the weight of the article placed on the platform $b$. These parts of the apparatus are of ordinary construction and operate in the usual manner, the pressure of a weight placed upon the platform $b$ forcing it downward against the tension of the spring $e$, and the downward movement of the platform being communicated by a rack $i$ to the pinion $g'$ on the shaft $g$ and through that medium to the hand $h$.

It has been found difficult in scales of the prior art to properly adjust the rack and the pinion so as to provide for an equal circular movement of the hand for a given degree of rectilinear movement of the platform and its standard and therefore of the rack which is secured to the standard and moves with it.

By means of my improvement all difficulties of adjustment and wear have been obviated by the use of a rack (shown on enlarged scale in Fig. 4), the teeth of which are cut on the same lines. The rack may be termed a lengthwise section of a cylindrical tap, the teeth being produced as by means of a die plate or they may be cut by any other convenient means so long as the teeth on the rack are in fact constructed as described. The teeth in the pinion are also cut on a like plan so as to fit and mesh into the teeth cut in the rack.

By means of this improvement a scale is produced in which the wear between the rack and pinion is compensated for with practical accuracy and a circular movement of the hand or index is exactly proportioned to the up and down movement of the standard on which the weight is supported or to which it is attached.

My invention is not limited to any particular size of rack or teeth thereon, nor to any particular construction of the pinion except as stated that the teeth in the respective parts shall be practical reproductions of a screw thread.

In the drawings herein the teeth on the pinion are shown of a greater depth at the center than at the edges thereof, but it is obvious that the teeth may extend across from side to side of the pinion, the depth between the teeth being equal their entire length and yet embody my improvement.

I claim as my invention—

1. In a weighing scale in combination with the weight supporting part and the rotary hand, a rack having its teeth cut to the shape and proportion of a screw thread, and a pinion having its teeth cut to fit the screw thread of the rack, all substantially as described.

2. In combination in a weighing machine a rack having its teeth formed on the plan of a screw thread, and a hand operating pinion having its teeth formed to correspond and intermesh with the teeth on the rack, all substantially as described.

JACOB HOLTZHOUSER.

Witnesses:
ALBERT GRAUER,
ARTHUR B. JENKINS.